UNITED STATES PATENT OFFICE.

CLARENCE LOUIS ARNOLDI, OF MANITOWOC, WISCONSIN.

PROCESS OF PRESERVING MILK.

1,403,223.

Specification of Letters Patent. Patented Jan. 10, 1922.

No Drawing. Application filed February 5, 1921. Serial No. 442,831.

*To all whom it may concern:*

Be it known that I, CLARENCE LOUIS ARNOLDI, a citizen of the United States, residing at Manitowoc, county of Manitowoc, and State of Wisconsin, have invented new and useful Improvements in Processes of Preserving Milk, of which the following is a specification.

My invention relates particularly to that class of processes for preserving milk, in which the primary object is to preserve the milk in its natural, fresh, sweet, palatable, and wholesome condition throughout considerable periods of time.

A further object of my invention is to provide means whereby the milk so preserved may either be dispensed as an attractive effervescent carbonated beverage, or as an ordinary quantity of fresh milk, substantially in the condition that it would be delivered by a milkman when less than twenty-four hours old.

My invention is also adapted to be utilized for the preservation of skim milk, butter-milk, and cream, and in general it may be assumed that these materials are to be regarded as included under the general designation "milk," although buttermilk and cream will, in some instances at least, contain acids which require a slight variation from my process as ordinarily performed.

Heretofore attempts have been made to preserve milk by charging it with carbon dioxid gas, $CO_2$. In some of these attempted preserving methods the natural flavor of the milk is largely destroyed by overheating or other preliminary sterilization. In other instances it has been attempted to partially sterilize the milk by passing carbonic acid gas through it, thereby reducing the acidity of the agents of decomposition, (microbes or bacteria), to such an extent as to prolong the period during which the milk will remain fresh under the conditions in which milk is ordinarily handled.

By the process or experiments last above mentioned, it has been possible to ship milk to a greater distance than would be possible in the case of untreated milk, because of the fact that the period during which the milk will remain fresh has been somewhat prolonged. But the benefits thus secured were comparatively short, except in the particular cases where the shipping distance was great, or where, for any other reason, it was desirable to keep the milk fresh for one or two days longer than would be possible with untreated milk handled under similar conditions in all other particulars.

I have discovered, however, that it is possible to subject milk to a preliminary treatment for the removal of foreign flavors and gases without in any way injuriously affecting, or substantially altering the quality of the milk, and that when the milk has been thus treated it may be heavily charged with carbonic acid gas under pressure, and confined in sealed containers while under such pressure, whereupon it may be stored and kept in its natural condition for long periods of time, i. e., for weeks, and even months, dependent, to some extent, upon temperature conditions, but principally dependent upon a strict conformity to my improved process, which will now be described in detail.

The milk to be treated in accordance with my process is first prepared by subjecting it to agitation under substantially twenty inches of vacuum at a temperature corresponding closely to the body heat of the animal from which the milk is derived, i. e., at a temperature ranging from 95° F. to approximately 101° F. The agitation will be continued, and the above mentioned temperature maintained under ordinary conditions for about five or ten minutes, after which it is promptly cooled nearly to the freezing point of water, preferably to a temperature somewhat below 40° F., but not sufficiently low to allow the water in the milk to freeze.

If the milk is more than ordinarily free from foreign flavors and gases, the period of agitation above referred to may be materially shortened, and in some instances it may be cooled immediately after receiving it from the producer to a temperature below 40° F., and it may then be subjected to the vacuum treatment, preferably with agitation while at such temperature, after which the temperature may be again reduced, if necessary, in order to bring it below 40° F., preparatory to carbonating it.

In either case, after the milk has been subjected to the vacuum treatment, it is carbonated at a pressure of about sixty pounds to the inch. Either the so-called continuous or the batch carbonation process may be followed. Both methods of charging liquid with carbonic acid gas are well known, and further description thereof is deemed unnecessary. After the milk has been thoroughly charged with $CO_2$ it is immediately delivered into kegs, cans, bottles, or other suitable containers while maintaining the pressure, and the containers are thereupon sealed, hermetically to prevent the gas from escaping.

Where the foreign flavors or gases in the milk are in excess of those ordinarily present, the vacuum method of removing them, as above described, may be repeated or prolonged, and if desired, particularly where batch carbonation is resorted to, it will be found desirable in some cases to subject the milk to the vacuum treatment above described, then carbonate it and again subject it to the vacuum treatment, removing the $CO_2$, and recharging the milk under pressure preparatory to packaging it.

Skim milk may be treated in substantially the same manner as above described with reference to the treatment of fresh milk, but in the case of buttermilk, regard must be had for the acidity of the material, and the pressure adjusted in accordance therewith to keep it from coagulation or precipitation. Such pressure should be maintained preparatory to and during the vacuum treatment, after which the buttermilk may be cooled, carbonated and packaged, as above described.

Cream which has been cooled to or below 50° F., and contains acidity low enough to keep it from curdling, or the fat from churning, may be subjected to the vacuum treatment, and subsequently cooled to a point slightly below 50° F., after which it is charged with $CO_2$ and packaged in the same manner as above described with reference to the treatment of fresh milk.

It will frequently be found desirable to reduce the acidity of the carbonic acid gas before charging the milk, and particularly before charging cream or buttermilk. The gas is preferably rendered slightly alkaline before using it for charging purposes so that it will not have any tendency to cause the milk to curdle. This will not always be necessary, but it will be very desirable wherever the conditions tend to promote a curdling of the milk, and such conditions are frequently present in cream and in buttermilk.

Milk packaged as above described may be kept fresh, sweet, and wholesome throughout long periods of time at normal temperatures, although to secure the best results it will be desirable to store the packages under conditions which allow the maintenance of an even temperature, and preferably allow temperature ranging from 35° F. to 50° F. A container or package containing such milk under pressure may be connected with a faucet, and the milk withdrawn for immediate use as an effervescent, wholesome beverage, having the full dietetic value of fresh milk. The carbonic acid gas remaining in the milk acts as a mild stimulant, and an aid to digestion, and in fact its presence adds to the nourishing value of the milk.

I claim:—

1. The process of preserving milk in its natural fresh, palatable, and wholesome condition, consisting in agitating it while fresh in a partial vacuum at substantially the normal body temperature of the animal from which it was derived, then reducing its temperature nearly to the freezing point, charging it with carbonic acid gas under pressure, and packaging it in sealed packages while under pressure of the contained gas.

2. The process of preserving milk which consists in agitating fresh milk in a partial vacuum at a temperature substantially equal to the bodily heat of the animal from which it was derived, subsequently reducing its temperature to substantially 40° F., charging it with $CO^2$ at a temperature of about 60 pounds to the inch, and packaging it at such temperature and pressure.

3. The process of preserving milk, which consists in freeing fresh milk from gases and foreign flavors while otherwise preserving it in its natural condition, charging it with carbonic acid gas at low temperature and high pressure, and confining it in hermetically sealed packages while under such temperature and pressure.

4. The process of preserving milk, which consists in freeing it from gases and foreign flavors while maintaining its temperature at substantially 100° F., then reducing its temperature to about 40° F., and charging it under pressure of about 60 pounds to the inch with carbonic acid gas having a neutral or slightly alkaline characteristic.

CLARENCE LOUIS ARNOLDI.

Witnesses:
FRANK HOFFMAN,
E. L. NASH.